United States Patent [19]

Tsuboi et al.

[11] Patent Number: 4,499,986

[45] Date of Patent: Feb. 19, 1985

[54] CONTROL APPARATUS FOR PASSENGER CONVEYOR

[75] Inventors: Nobuyoshi Tsuboi, Ibaraki; Seiya Shima, Katsuta; Morio Kanasaki, Katsuta; Hayashi Nakazawa, Katsuta, all of Japan

[73] Assignee: Hitachi, Ltd., Tokyo, Japan

[21] Appl. No.: 351,767

[22] Filed: Feb. 24, 1982

[30] Foreign Application Priority Data

Feb. 27, 1981 [JP] Japan .................. 56-27038

[51] Int. Cl.³ .................. B66B 9/00; B65G 17/00
[52] U.S. Cl. .................. 198/322; 198/323; 198/856
[58] Field of Search ........... 198/322, 323, 856, 857, 198/330, 855; 318/771

[56] References Cited

U.S. PATENT DOCUMENTS

| | | | |
|---|---|---|---|
| 1,987,272 | 1/1935 | Sprecker | 198/322 |
| 2,106,833 | 2/1938 | Eames | 198/322 |
| 2,130,584 | 9/1938 | Hobart | 318/771 |
| 2,315,469 | 3/1943 | Warrington | 318/771 |
| 2,317,266 | 4/1943 | Galt, Jr. | 318/771 |
| 2,697,193 | 12/1954 | Jones | 318/771 |
| 2,709,775 | 5/1955 | Del Carlo | 318/771 |
| 3,940,668 | 2/1976 | Apsit et al. | 318/771 |
| 4,023,135 | 5/1977 | Hanmura et al. | 367/93 |
| 4,042,966 | 8/1977 | Newell et al. | 318/771 |
| 4,413,218 | 11/1983 | Taylor et al. | 318/771 |
| 4,425,539 | 1/1984 | Wills | 318/771 |
| 4,434,394 | 2/1984 | Kellogg et al. | 318/771 |

FOREIGN PATENT DOCUMENTS

| | | | |
|---|---|---|---|
| 721369 | 12/1931 | France | 198/322 |
| 64781 | 5/1977 | Japan | 198/323 |
| 116690 | 10/1978 | Japan | 198/323 |
| 159988 | 12/1979 | Japan | 198/323 |
| 2050984 | 5/1979 | United Kingdom | 198/322 |

*Primary Examiner*—Joseph E. Valenza
*Assistant Examiner*—Daniel R. Alexander
*Attorney, Agent, or Firm*—Antonelli, Terry & Wands

[57] ABSTRACT

A control apparatus for a passenger conveyor driven by a three-phase induction motor which is capable of being put selectively into a star-connection or a delta-connection mode. A load of the conveyor is detected on the basis of a current and a voltage supplied to the induction motor, so that when the load is large the motor is driven in the delta-connection mode while when the load is small the motor is driven in the star-connection mode so as to save the power consumption of the conveyor when the load is small.

8 Claims, 9 Drawing Figures

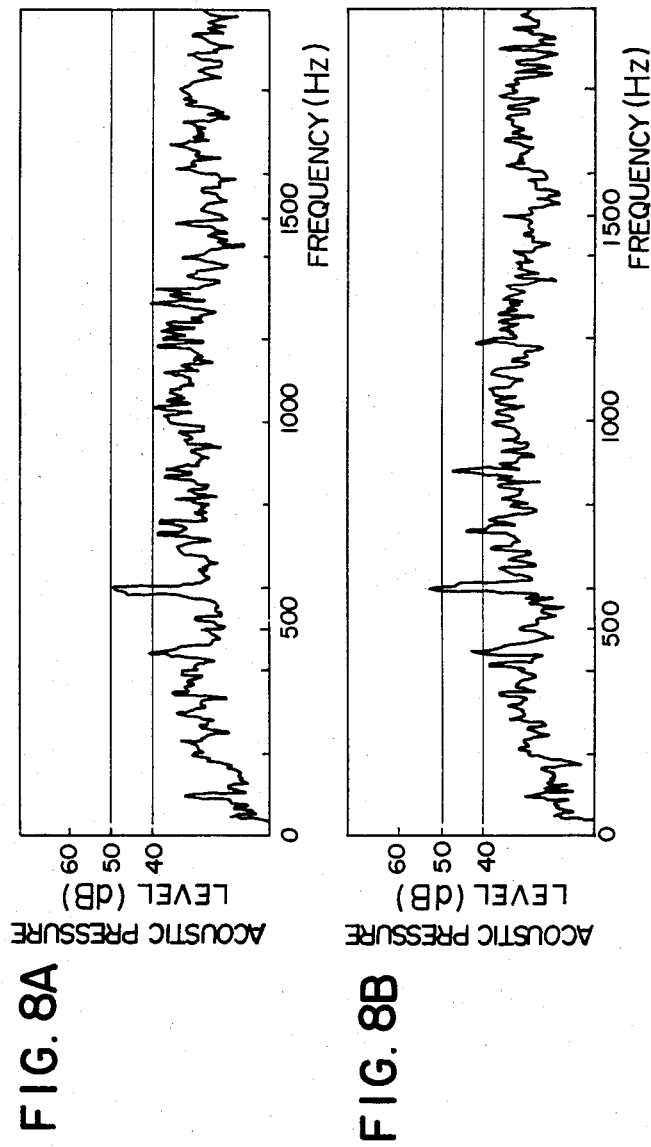

CONTROL APPARATUS FOR PASSENGER CONVEYOR

The present invention relates to a control apparatus for a passenger conveyor.

Once driven, a passenger conveyor usually runs continuously at a predetermined speed for the whole day. Therefore, a three-phase induction motor is suitable to drive such a passenger conveyor, as described, for example in U.S. Pat. No. 3,658,166 and U.S. Pat. No. 3,896,925. In these patents, an induction motor having a capacity determined by the rated load torque of the conveyor is driven in the form of a delta-connection.

On the other hand, a passenger conveyor seldom conveys passengers corresponding to its rated maximum torque but it is usually driven with a several per cent of the full transportation load or sometimes with no load. In other words, in most of the operations the motor is used to drive the conveyor with a lower load factor with respect to its capacity and with a low efficiency.

In order to raise the efficiency, there has recently been employed a system wherein the existence of a passenger or passengers is detected to selectively stop or start the conveyor based on the result of detection. In the system, since the conveyor may stop when there is no passengers on it, the power consumption may be saved for the stopped period of time. However, if there is even one passenger on the conveyor, the conveyor has to run as in the conventional system. The efficiency is still low in such a system which often conveys a few passengers. In addition, in such a system, in the case where the conveyor happens to come to a stop because of absence of passengers therefor, subsequent passengers who are about to ride thereon might wrongly take it to be out of service. For such a reason, in a building such as a department store which is available for a large number of non-specific persons and which therefore takes a serious view of serviceability, the conveyor can not stop even if there is no passenger. Thus, the conveyor must be operated continuously as in the conventional system.

Accordingly, a main object of the present invention is to provide a control apparatus for a passenger conveyor in which power consumption may be reduced.

A main feature of the present invention is that the transportation demand for a passenger conveyor is detected so that to the transportation demand, a three-phase induction motor for driving the conveyor is selectively switched between a star-connection mode and a delta-connection mode in accordance with the detected transportation demand.

Further, according to an embodiment of the present invention, smooth or comfortable safe riding condition is considered.

The above and other objects and advantages of the present invention will become clear from the following description with reference to the accompanying drawings, in which:

FIGS. 8A and 8B show measurement results of noise suppression effects according to the present invention.

Three types may be considered as a transportation demand detector for a passenger conveyor, as follows:
(1) A detector of a first type in which passengers are directly detected;
(2) A detector of a second type in which passengers are indirectly detected; and
(3) A detector of a third type in which passengers are detected based on an estimate.

As the first type detector, the "apparatus for detecting the number of objects" disclosed in U.S. Pat. No. 4,023,135 and U.S. Pat. No. 4,112,419 is available. The apparatus is based on the fact that if ultrasonic waves are directed toward passengers the intensity of the waves reflected therefrom are proportional to the number of passengers. Therefore, this type of detector can be used to detect the quantity of passengers with accuracy sufficient to embody the present invention.

The second type detector is based on the fact that the load of a motor for driving a passenger conveyor varies depending upon the quantity of passengers. In the detector, accordingly, the current or power of the motor is detected to measure the passenger quantity. The detector of this type will be detailed later in connection with an embodiment of the present invention.

According to the third type detector (3), the time range or ranges where passengers on the conveyor increase are detected, for example, by means of a timer. In the event that the conveyor is installed in such a place where passengers on the conveyor increase only in such specific time ranges as office-going/leaving hours and lunch time, the transportation demand for the conveyor can easily be estimated only by setting the specific time ranges in the timer mentioned above.

Although the following explanation will be made with respect to an embodiment of the present invention in which the second type detector mentioned above is utilized, it will be readily understood that the detectors of the first and the third type may be utilized to the present invention, if desired.

Figure 1:
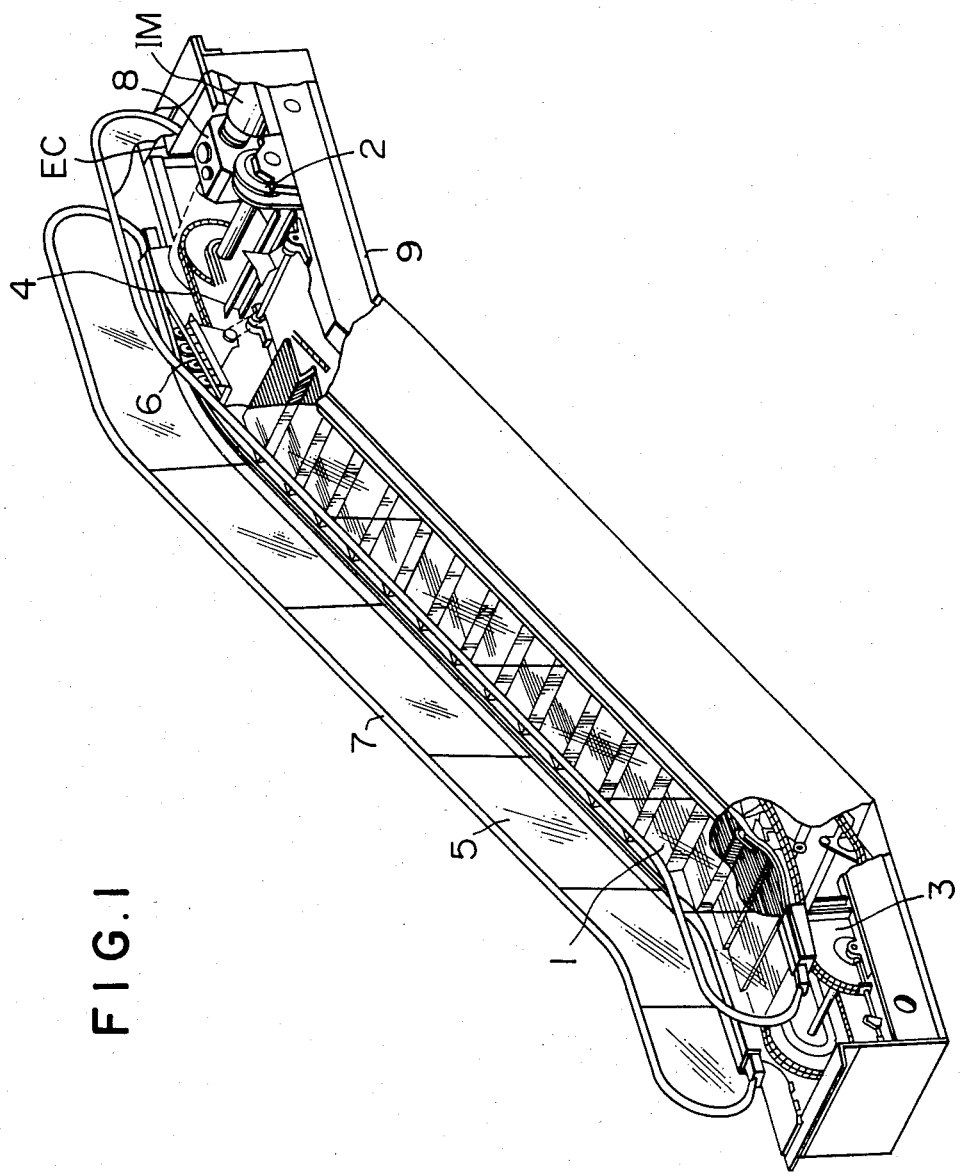
FIG. 1 is a schematic perspective view of an embodiment of a passenger conveyor in accordance with the present invention.

Referring now to FIG. 1, there is shown a schematic perspective view of a passenger conveyor according to the present invention, partly in section at its upper and lower ends to illustrate its internal structures. As illustrated in the figure, step plates 1 are interconnected to each other in an endless form substantially along a length of the conveyor and driven by an endless chain 4 which is hung between sprockets 2 and 3 to pass therearound. On the both sides of the step plates 1, disposed are upright supports or balusters 5 each of which has a length corresponding to the total length of the step plates 1. Each of the balusters 5 supports at its top a hand rail 7 which is moved in synchronism with the step plates by a hand rail driver 6. The step plates 1 can be moved upward or downward through a reduction gear box 8 and the chain 4 by a three-phase induction motor IM which is selectively switchable between star- and delta-connection modes. EC designates a controller for the conveyor. The controller EC provides a feature of the present invention, and will be explained in detail later. These components constituting the conveyor are supported by a frame 9 and installed between floors in the building.

Figure 2:
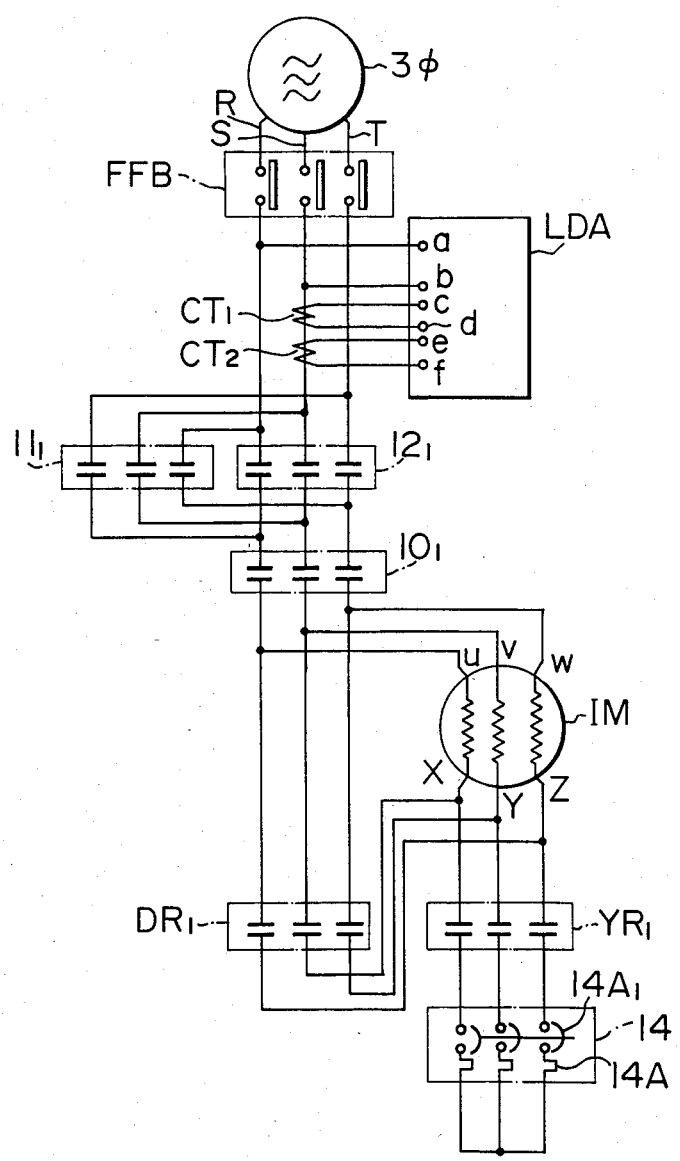
FIG. 2 is a main circuit diagram of a passenger conveyor in accordance with the present invention.

FIG. 2 is a main circuit diagram of the passenger conveyor in accordance with the present invention. As shown in FIG. 2, phase terminals R, S and T of a three-phase a.c. power source $3\phi$ are connected respectively to input terminals u, v, and w of a three-phase induction motor IM, through a main circuit breaker FFB, an electromagnetic contactor 11, for upward movement or an electromagnetic contactor 12, for downward movement, and an electromagnetic contactor 10, for operation start. As shown in FIG. 2, the terminals X, Y and Z of the motor IM are connected respectively to an electromagnetic contactor $DR_1$ for a delta-connection mode and an electromagnetic contactor $YR_1$ for a star-connection mode. The contactors $DR_1$ and $YR_1$ function to selectively put the motor IM in a delta-connection mode or a star-connection mode under control by a control circuit of FIG. 6. An overcurrent relay 14 is provided to protect the power source $3\phi$ from being short-circuited in the case where the contactors $DR_1$ and $YR_1$ are both closed. More specifically, the relay 14 includes a current detecting coil 14A and a relay $14A_1$. As soon as the detection coil 14A senses an excess current, the relay $14A_1$ is opened to cut off the star-connection of the motor. A load detection circuit LDA is the second type detector mentioned above, and is used to detect the transportation demand for the conveyor. The load detection circuit LDA receives across its terminals a and b a phase voltage between the phases R and S, and at its terminals c to f a phase current of the phase S detected by current detectors $CT_1$ and $CT_2$.

Figure 3:
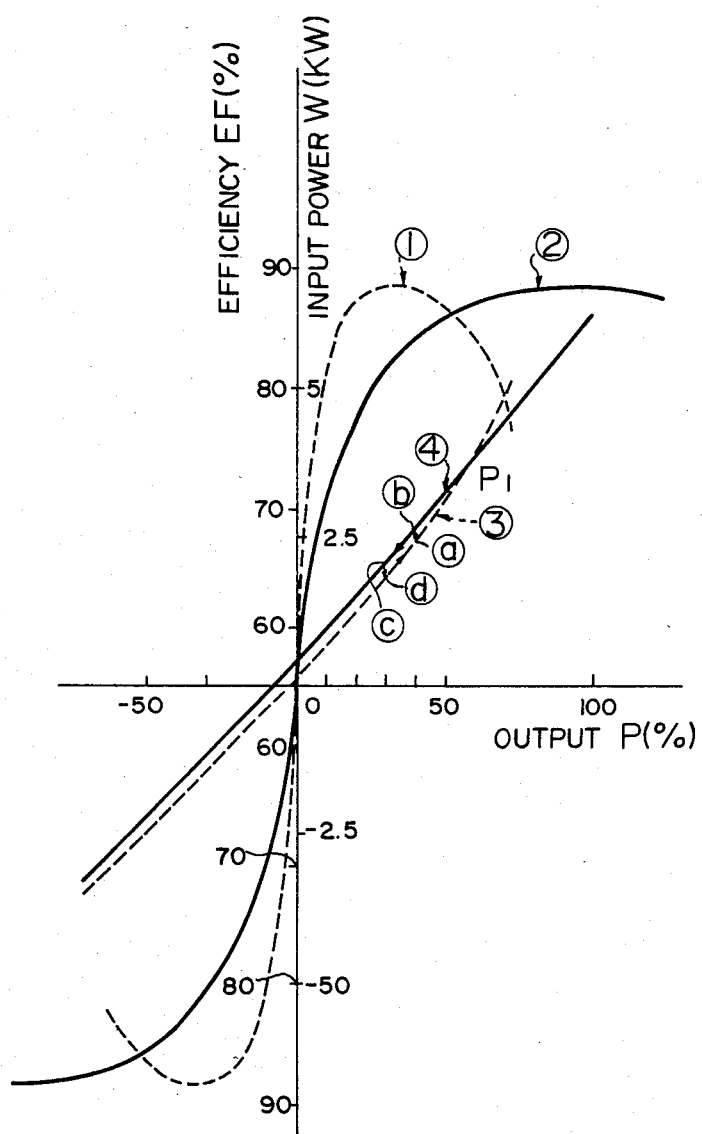
FIG. 3 is a characteristic diagram showing the relationship between the efficiency/input power and the output of the conveyor, for explanation of the principle of the present invention.

Now, for the better understanding of the present invention, the operational principle of this embodiment will be explained with reference to FIGS. 3 and 4. FIG. 3 is a diagram illustrating the characteristic of the three-phase induction motor IM including the efficiency characteristic of the reduction gear box 8. In particular, the diagram shows the relationship between the efficiency EF and the output P of the gear box 8 linked to the motor IM and the relationship between the input voltage W and the output P. In the figure, a curve ① indicates the efficiency characteristic in the case where the motor is wired in the star-connection mode, a curve ② indicates the efficiency characteristic in the case where the motor is wired in the delta-connection mode, a curve ③ indicates the power consumption characteristic in the case where the motor is wired in the star-connection mode and a curve ④ indicates the power consumption characteristic in the case where the motor is wired in the delta-connection mode.

As seen from the figure, the star-connection configuration is higher in efficiency and less in power consumption than the delta-connection one, within the range where the output P is below about 50% of the rated value. The relationship between the efficiency and power consumption as mentioned above is reversed and the efficiency in the star-connection arrangement abruptly drops if the output power P exceeds a value slightly higher than 50% of the rated value, resulting in a status where satisfactory torque can not be obtained.

In view of this point, in the embodiment of the present invention, the connection of the motor IM is changed over between star- and delta-connections depending on the transportation demand for the conveyor so that the motor IM is operated with high efficiency, thereby minimizing the power consumption.

In this embodiment, the load condition of the motor IM is detected by measuring the input power W and the motor connection is changed over between the star- and delta-connections in accordance with the magnitude of the detected input power W.

In this case, however, if the change-over is effected merely depending on the magnitude of detected input power W, the change-over operations would be very frequently undesiredly repeated due to the fluctuations in the power W in the vicinity of the value thereof at which the change-over be effected.

In order to avoid this, in this embodiment, different switching values are set to a first power level (nearly at 40% level of the output P) for changeover from the star- to delta-connection and to a second power level (nearly at 30% level of the output P) for change-over from the delta- to star-connection, so that after switching to the delta-connection has been completed at a point ⓐ, a switching operation to the star-connection is inhibited until the power W drops below a point ⓒ for stable control, as it will be clear from the figure.

In this way, the load condition of the motor IM has been detected in the form of power in order to avoid adverse effect resulting from voltage fluctuations in the power source $3\phi$. However, in the case where the voltage of the power source $3\phi$ does not so fluctuates, the change-over of connections may be effected by using only the input current of the motor IM.

Figure 4:
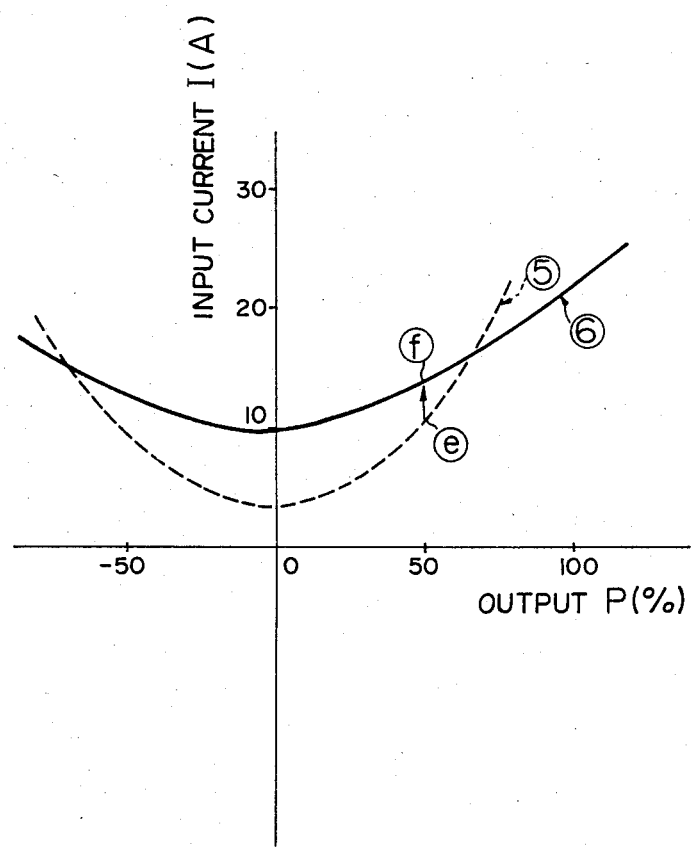
FIG. 4 is a characteristic diagram showing the relationship between the input current and the output, for explanation of the principle of operation of the present invention.

FIG. 4 is a characteristic diagram showing the relationship between the input current I and the output P of the motor IM together with the reduction gear box 8. In the figure, curves ⑤ and ⑥ indicate input currents in the case of the star-connection and delta-connection arrangements, respectively. As known well, if the voltage of the power source $3\phi$ is maintained constant, the magnitude of a load for the motor IM is proportional to the magnitude of the input current I. In this embodiment, a current detector is provided as a backup of the power detector, so that in the case where a change-over to the delta-connection mode by the power detector fails to be effected, the backup detector (i.e. the current detector) will cause a forcible change-over to the delta-connection mode when the fact is detected that the current I reaches a value corresponding to about 50% level of the output P at a point ⓔ on the curve ⑤.

Figure 5:
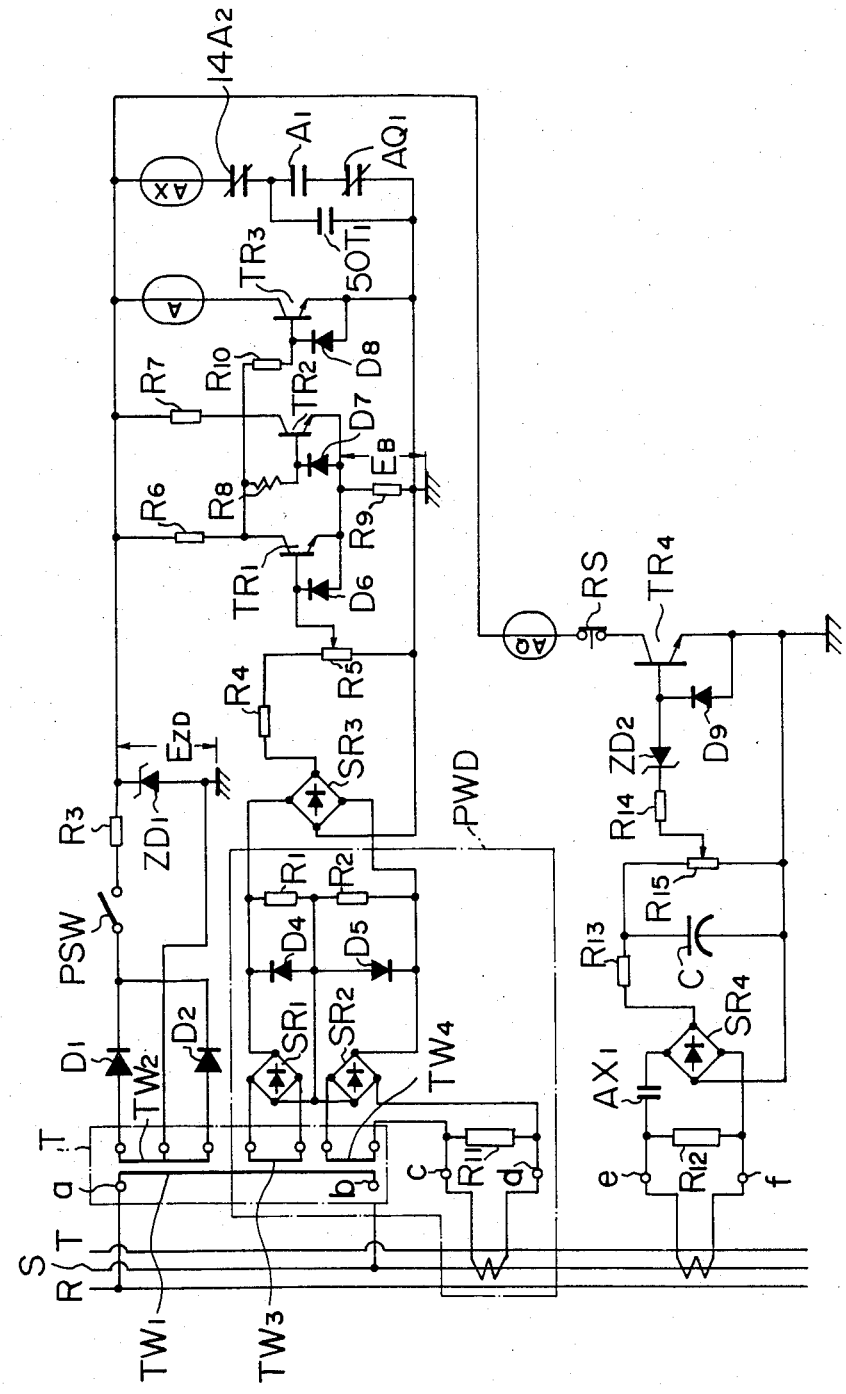
FIG. 5 is a circuit diagram of an embodiment of a load detector which constitutes a transportation demand detector according to the present invention.
Figure 6:
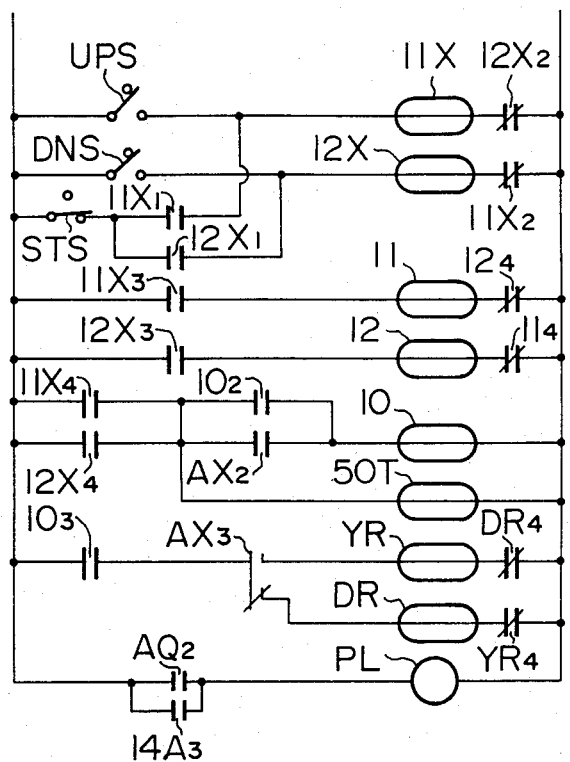
FIG. 6 is a circuit diagram of an embodiment of a passenger conveyor control circuit according to the present invention.

FIGS. 5 and 6 show embodiments of means for controlling the passenger conveyor based on the operational principle as mentioned above.

FIG. 5 shows an embodiment of the load detection circuit shown in FIG. 2. As shown in FIG. 2, the phase terminals R and S of the power source $3\phi$ are connected across a primary winding $TW_1$ of a transformer T so that a secondary winding $TW_2$ thereof produces a fixed d.c. voltage $E_{ZD}$ via diodes $D_1$ and $D_2$, a resistor $R_3$ and a Zener diode $ZD_1$.

A well-known power detector PWD is provided to detect the load of the induction motor IM. As illustrated in FIG. 5, secondary windings $TW_3$ and $TW_4$ of the transformer T produce voltages proportional to the phase voltage between the phase lines R and S. The voltages produced across the respective secondary windings are then combined with a voltage which appears across a detection resistor $R_{11}$ and which is proportional to the R-phase current detected by the detector $CT_1$. The combined voltage are rectified by full-wave rectifying bridge circuits $SR_1$ and $SR_2$ and then applied to output resistors $R_1$ and $R_2$. A voltage appearing across each of the output resistors $R_1$ and $R_2$ is proportional to the input power W shown in FIG. 3. The input power W assumes a positive or a negative value depending upon the running direction (upward or downward) of the passenger conveyor. A voltage proportional to the absolute value of the input power W is supplied to resistors $R_4$ and $R_5$ through full-wave current bridge circuit $SR_3$. As a result, a voltage appearing across the variable resistor $R_5$ is proportional to the power consumed by the motor IM.

The load detection circuit of FIG. 5 further includes transistors $TR_1$ to $TR_3$, an auxiliary relay coil A for star-delta change-over, a relay coil AX for star-delta change-over command, and a relay coil AQ for star change-over command. Resistors $R_6$ and $R_7$ are selected to be $R_6 > R_7$.

In operation, first, a power switch PSW is turned on to energize the load detection circuit of FIG. 5. This causes the transistors $TR_2$ and $TR_3$ to receive base voltages respectively through the resistor $R_6$ and a resistor $R_8$ and through the resistor $R_6$ and a resistor $R_{10}$. Thus, the transistors $TR_2$ and $TR_3$ are made conductive. When the transistor $TR_3$ is made conductive, the auxiliary relay A is energized so that a contact $A_1$ is closed to energize or excite the star- delta change-over command relay coil AX. The contacts of the relay coil AX are inserted in the conveyor control circuit of FIG. 6 so that the induction motor IM is put into the star-connection mode when the relay coil AX is excited and into the delta-connection mode when the relay coil AX is deenergized. Under this condition, contacts $14A_2$ and $AQ_1$ are closed, as will be described later.

In this way, as soon as the power switch PSW is turned on, the change-over command relay coil AX is energized and the induction motor is operated in the star-connection mode. In this mode, a terminal voltage $E_B$ appearing across a bias resistor $R_9$ is $$E_{ZD} \cdot \frac{R_9}{R_7 + R_9}.$$

On the other hand, the transistor $TR_1$ is supplied at its base terminal with a voltage properly divided by the variable resistor $R_5$. The base voltage is proportional to the input power of the motor IM, as has been explained earlier. Therefore, if passengers to be carried by the conveyor so increase in number that the input power of the motor IM correspondingly increases and that the base voltage of the transistor $TR_1$ exceeds the bias voltage $E_B$ across the resistor $R_9$, the transistor $TR_1$ is made conductive. Upon the conduction of the transistors $TR_1$, the transistors $TR_2$ and $TR_3$ are turned off because the respective base voltages of the transistors $TR_2$ and $TR_3$ are lowered. This causes the auxiliary relay coil A and the relay coil AX to be both deenergized, whereby a command is issued from the relay coil AX so as to put the motor IM into the delta-connection mode.

More specifically, the bias voltage $E_B =$ $$E_{ZD} \cdot \frac{R_9}{R_7 + R_9}$$

is set at a level corresponding to the point ⓐ in FIG. 3 so that as soon as the output P exceeds 40% level of the rated value, the change-over into the delta-connection mode can be automatically effected.

In the delta-connection mode, the bias voltage $E_B$ appearing across the resistor $R_9$ changes to the value $$E_{ZD} \cdot \frac{R_9}{R_6 + R_9}.$$

Since the resistors $R_6$ and $R_7$ are selected to be $R_6 > R_7$ as has been explained, the bias voltage $E_B$ is lowered. The bias voltage $E_B =$ $$E_{ZD} \cdot \frac{R_9}{R_6 + R_9}$$

is set at a level corresponding to the point ⓒ in FIG. 3 so that once the delta-connection mode has been established, a change-over operation into the star-connection mode can not be effected until the input power W drops to a level less than that at the point ⓒ. As soon as the input power W so drops that the base voltage of the transistor $TR_1$ is lowered to a level below the above-mentioned value $$E_B = E_{ZD} \cdot \frac{R_9}{R_6 + R_9},$$

the transistor $TR_1$ is turned off, whereby the detection circuit of FIG. 5 is returned to the initial state so that the change-over command relay AX is energized to put the motor into the star-connection mode.

In this way, the detection circuit of FIG. 5 functions to generate a command to effect a selective change-over between the star- and delta-connection modes according to the input power of the motor IM and therefore according to the quantity of passengers on the conveyor.

On the other hand, the current detector $CT_2$ is provided as a backup. The output of the current detector $CT_2$ is supplied to a resistor $R_{12}$ and a voltage appearing across the resistor $R_{12}$ is proportional to the S-phase current. When the relay coil AX is energized, the voltage across the resistor $R_{12}$ is supplied to a resistor $R_{15}$ via a smoothing circuit which comprises a full-wave rectification, bridge circuit $SR_4$, a resistor $R_{13}$ and a capacitor c. The voltage thus applied to the resistor $R_{15}$ is proportional to the current I shown in FIG. 4. A Zener diode $ZD_2$ is set at a level corresponding to the value at the point ⓔ (corresponding to 50% level of the rated output P) in FIG. 4 so that a transistor $TR_4$ is turned on when the current I on the U-phase line of the motor IM exceeds the point ⓔ, whereby the delta-connection change-over command relay coil AQ is energized to deenergize the star-delta changeover command relay coil AX because the contact $AQ_1$ of the relay AQ is opened.

In this way, the delta-connection change-over relay coil AQ acts to forcibly switch the motor into the delta-connection mode as soon as the output P exceeds the 50% level of the rated value thereof, in spite of the fact that the star-delta change-over command relay coil AX is maintained energized and the conveyor is operated in the star-connection mode. If the circuit on the side of the power detector PWD is normal, the relay coil AX is deenergized at a point where the output P exceeds its 40% level to thus open the contact $AX_1$ of the relay AX. Therefore the delta-connection command relay coil AQ can never be energized. Once the relay coil AQ is energized, the delta-connection mode is held for the purpose of safe conveyor operation so long as a reset switch RS is not released.

FIG. 6 shows a control circuit for the passenger conveyor. In FIG. 6, the symbol UPS denotes an upward run command switch for upward operation of the conveyor and the sumbol DNS denotes a downward run command switch for downward operation of the conveyor.

Now, explanation will be directed to the upward operation of the conveyor. When the upward command switch UPS is turned on, an auxiliary relay coil 11X for upward operation is excited so that a contact $11X_1$ thereof is closed to hold the relay 11X in the self-sustained state and a contact $11X_2$ thereof is opened to interlock an auxiliary relay coil 12X for downward operation to prevent its excitation. A normally closed stop switch STS is turned off to open the self-sustained circuit thereof when the conveyor is stopped.

When a contact $11X_3$ of the relay 11X is closed, a relay coil 11 for upward operation is energized thereby opening a contact $11_4$ of the relay 11 to cause a relay coil 12 for downward operation to be interlocked.

Under this condition, the star-delta changeover command relay coil AX in FIG. 5 is energized. As a result, contacts $11_{X4}$ and $AX_2$ are closed to energize an operation relay coil 10 and keep the relay 10 in the self-sustained state by means of a contact $10_2$ of the relay 10. At the same time, a contact $10_3$ of the relay 10 is closed and a normally-open contact $AX_3$ of the relay AX is closed to energize a relay coil YR for star-connection. When the relay YR is energized, its contact $YR_4$ is opened to interlock a relay coil DR for delta-connection.

In this way, when the upward operation relay coil 11, the operation relay coil 10 and the star-connection relay coil YR are energized, the upward operation contactor $11_1$, the operation contactor $10_1$ and the star-connection contactor $YR_1$ are closed in FIG. 2, so that the induction motor IM is driven in the star-connection mode to move the conveyor upward.

Upon starting the induction motor IM, a starting current may temporarily increase the power consumption, and therefore the star-delta-connection change-over auxiliary relay coil A and the delta-connection change-over relay coil AS may be temporarily deenergized so as to temporarily deenergize the star-delta change-over command relay coil AX, whereby the motor might unwantedly be switched into the delta-connection mode. In order to avoid such change-over operation into the delta-connection mode at the time of starting the motor, a timing relay coil 50T is provided in FIG. 6 so that its contact $50T_1$ (see FIG. 5) is closed for a desired period of time after the motor has been started, to allow energization of the changeover command relay coil AX regardless of the states of the contacts $A_1$ and $AQ_1$.

With the arrangement as described above, as soon as passengers to be carried by the conveyor increase in number in its upward operation so that the output P of the motor IM exceeds 40% level (corresponding to the point ⓐ in FIG. 3) of the rated output, the star-delta change-over command relay coil AX is deenergized, as has been explained earlier. The deenergization of the relay coil AX causes the normally-open side of the contact $AX_3$ in FIG. 6 to be opened and a normally-closed side of the same contact $AX_3$ to be closed, so that the star-connection relay coil YR is deenergized while the delta-connection relay coil DR is energized. As a result, the contactor $YR_1$ is opened and the contactor $DR_1$ is closed in FIG. 2 to allow a generation of torque enough to drive a large load from the induction motor IM, so that the conveyor can be efficiently operated by the motor in the delta-connection mode, because the delta-connection mode is higher in efficiency than the star-connection mode.

In this way, the star-connection contactor $YR_1$ and the delta-connection contactor $DR_1$ in FIG. 2 are selectively switched according to the load torque of the motor, i.e., the quantity of riders on the conveyor. If the switching time is too long, however, corresponding fluctuations in the torque would provide uncomfortable shock to the passengers. Therefore, it is preferable to shorten the switching time as much as possible. However, arcing may take place between contact pairs when alive contactors are opened. At this time, because the contactor is momentarily electrically linked or closed for a short time due to the arc phenomenon between contact pairs even if mechanically opened, there is a possibility that a momentary and undesirable short-circuit is caused between lines. If such a momentary short-circuit phenomenon occurs between lines, a large short-circuit current would cause all or some contact pairs in the contactor $DR_1$ or $YR_1$ to be melted into their permanently closed condition, so that the power source 3∅ is permanently short-circuited and the main circuit breaker FFB is tripped to thus stop the conveyor, disabling the conveying operation thereof. In order to avoid such a situation, the overcurrent relay 14 is provided in FIG. 2. The overcurrent relay 14 may operate prior to the breaker FFB. More specifically, as soon as the relay 14 detects a large short-circuit current resulting from a short-circuited power source, the relay 14 opens its contact $14A_1$ to forcibly cut off the star-connection circuit. At the same time, the relay 14 opens also its contact $14A_2$ (FIG. 5) to maintain the delta-connection contactor $DR_1$ closed, so that the conveyor operation can be maintained to secure its service even in the case where the contactor $YR_1$ or $DR_1$ is melted to thus make contact pairs closed permanently. It will be readily understood that the overcurrent relay 14 may be provided on the side of the delta-connection contactor $DR_1$. In this case the conveyor can be continuously operated in the star-connection mode in case where either one of the contactors is melted at its contacts. However, the former embodiment is superior in operational safety to the latter, when it is taken into the consideration the case where the conveyor may carry an increased number of passengers.

A malfunction indication lamp PL shown in FIG. 6 is used to indicate a faulty condition of the conveyor for repair. When the overcurrent relay 14 is actuated, its contact $14A_3$ is closed and the fault indication lamp POL is lit up or illuminated. Even in the event where the output P from the motor IM exceeds 40% level (corresponding to the point ⓐ in FIG. 3) of the rated output for some reasons but the change-over to the delta-connection mode has been performed by the relay coil AQ, as has been explained in connection with FIG.

5, the contact AQ$_2$ of the relay AQ is closed to thereby light up the faulty indication lamp PL.

Although the above explanation has been made in the case of the upward operation of the conveyor, it will be easily appreciated that the same can be true for the downward operation thereof. Further, the load detection circuit of FIG. 5 has been used as a transportation demand detecting circuit in the illustrated embodiment, but the present invention is not limited to this embodiment and a detector of the first or third type as explained earlier may be employed.

That is, in the case where the first type detector is employed, the output voltage of the apparatus for detecting the number of objects or passengers on the conveyor is proportional to the number of passengers. In this connection, change-over between the delta- and star-connection modes can be carried out according to the quantity of passengers in exactly the same manner as in the embodiment by applying across the variable resistor R$_5$ the output voltage of the detection apparatus in place of the power detector PWD in FIG. 5. Moreover, since the detection apparatus can also detect the presence or absence of passengers who are going to ride on the conveyor, the present invention may be designed so that in the presence of passengers the upward or downward operation switch UPS or DNS is turned on, while in the absence of passengers the stop switch STS is turned off. This arrangement can allow not only minimization of power consumed by the motor during operation of the conveyor by selectively switching between delta- and star-connection modes depending on the quantity of passengers, but also saving of power during the stopping period of time of the conveyor by stopping the conveyor in the absence of passengers. In department store applications, however, it is favorable to continuously efficiently drive the conveyor in the star-connection mode even in the absence of passengers for the major purpose of its serviceability.

Figure 7:
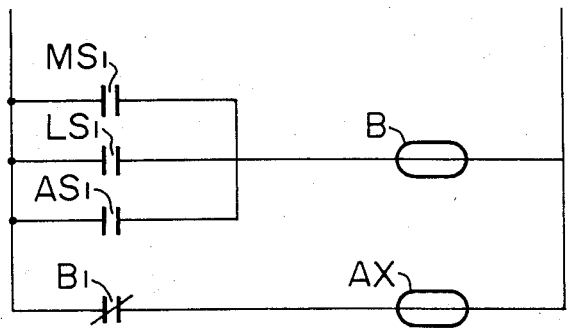
FIG. 7 is a circuit diagram of another embodiment of the transportation demand detector according to the present invention.

There is shown in FIG. 7 another embodiment of the present invention in which a transportation demand detecting circuit of the third type mentioned above. In FIG. 7, a contact MS$_1$ is closed during the office-going period of time, a contact LS$_1$ is closed during the lunch period of time, a contact AS$_1$ is closed during the office-leaving period of time, on the assumption that the conveyor carries an increased number of passengers only during these lunch and office-going/leaving periods of time. Therefore, in each of these rush hours, an auxiliary relay coil B for delta-star change-over is energized to open its contact B$_1$, which causes the star-delta change-over command relay coil AX to be deenergized. In this case, the change-over between star- and delta-connection modes can be achieved by replacing the circuit of FIG. 5 with the circuit of FIG. 7 based on the estimation of such rush hour periods of the transportation demand for the conveyor. It goes without saying that the rush hour periods are not restricted to the office-going/leaving and lunch periods of time and may be set depending on the conditions of the conveyor installed place, as necessary.

According to the present invention, not only the power can be saved by driving the induction motor IM in the star-connection mode during period of less transportation demand of the conveyor, but noises resulting from the conveyor can also be suppressed.

FIGS. 8A and 8B show measuring results of noise when the conveyor is operated in the star-connection mode and in the delta-connection mode, respectively. In each of FIGS. 8A and 8B, the ordinate denotes the acoustic pressure level and the abscissa denotes the frequency. It will be readily seen from the measuring results in FIGS. 8A and 8B that the noise higher than 40 dB level in the star-connection mode is less than that in the delta-connection mode and especially the peak noise level at the vicinity of 600 Hz in the star-connection mode can be reduced by about 3 dB when compared with that in the delta-connection mode. Such noise from the conveyor causes a problem especially when a small number of passengers are on the conveyor and when the noise level from the vicinity of the conveyor is relatively low. According to the present invention, however, since the conveyor is driven in the star-connection mode when it is in such a relatively low noise environment or surroundings, the noise level issued from the conveyor itself can be advantageously made lower.

What is claimed is:

1. A control apparatus for a passenger conveyor which comprises step plates interlinked to one another in an endless form for transporting passengers thereon, and a three-phase induction motor for driving said step plates and capable of being changed over between star- and delta-connection modes, said control apparatus comprising:

transportation demand detecting means for detecting transportation demand for said passenger conveyor on the basis of electric power supplied to said three-phase motor;

means for setting a first predetermined value and a second predetermined value smaller than said first predetermined value; and change-over means for switching the winding connection of said induction motor into the delta-connection mode when the transportation demand exceeds said first predetermined value and for switching the winding connection of said induction motor into the star-connection mode when the transportation demand is below said second predetermined value.

2. A control apparatus as set forth in claim 1, wherein said transportation demand detecting means includes means for detecting the electric power supplied to said induction motor and means for detecting a current supplied to said motor, and wherein said change-over means includes means for changing said motor into the delta-connection mode when the output of said power detecting means exceeds a third predetermined value as well as when the output of said current detecting means exceeds a fourth predetermined value.

3. A control apparatus as set forth in claim 2, wherein the value of transportation demand represented by said fourth predetermined value of the output of said current detecting means is set to be larger than the value of transportation demand represented by said third predetermined value of the output of said power detecting means.

4. A control apparatus as set forth in claim 1, wherein said apparatus further comprises overcurrent detecting means for detecting the fact that a current supplied to said induction motor has exceeded a third predetermined value, and means for cutting off a selected one of the star-connection and the delta-connection of said motor in response to the output of said overcurrent detecting means.

5. A control apparatus as set forth in claim 4, further comprising means for maintaining the other of said star-connection and delta-connection that has not been cut off by said cutting-off means in response to said overcurrent detecting means.

6. A control apparatus as set forth in claim 4, wherein said cutting-off means includes an electromagnetic contactor connected to one of the star-connection and the delta-connection of said induction motor.

7. A control apparatus as set forth in claim 4, further comprising an abnormal condition indication lamp which lights up in response to said overcurrent detecting means.

8. A control apparatus as set forth in claim 1, wherein said change-over means includes means for maintaining said motor in the star-connection mode, regardless of the output of said transportation demand detecting means, for a predetermined period of time after said conveyor has been started.

* * * * *